March 23, 1965 W. H. PULS 3,174,754

TONE ARM BRAKE ASSEMBLY

Filed Dec. 23, 1960

INVENTOR
Werner H. Puls
BY Francis W. Crotty
ATTORNEY 3,174,754

TONE ARM BRAKE ASSEMBLY

Werner H. Puls, Northbrook, Ill., assignor to Zenith Radio Corporation, a corporation of Delaware Filed Dec. 23, 1960, Ser. No. 77,949
3 Claims. (Cl. 274—15)

Figures 1, 2:
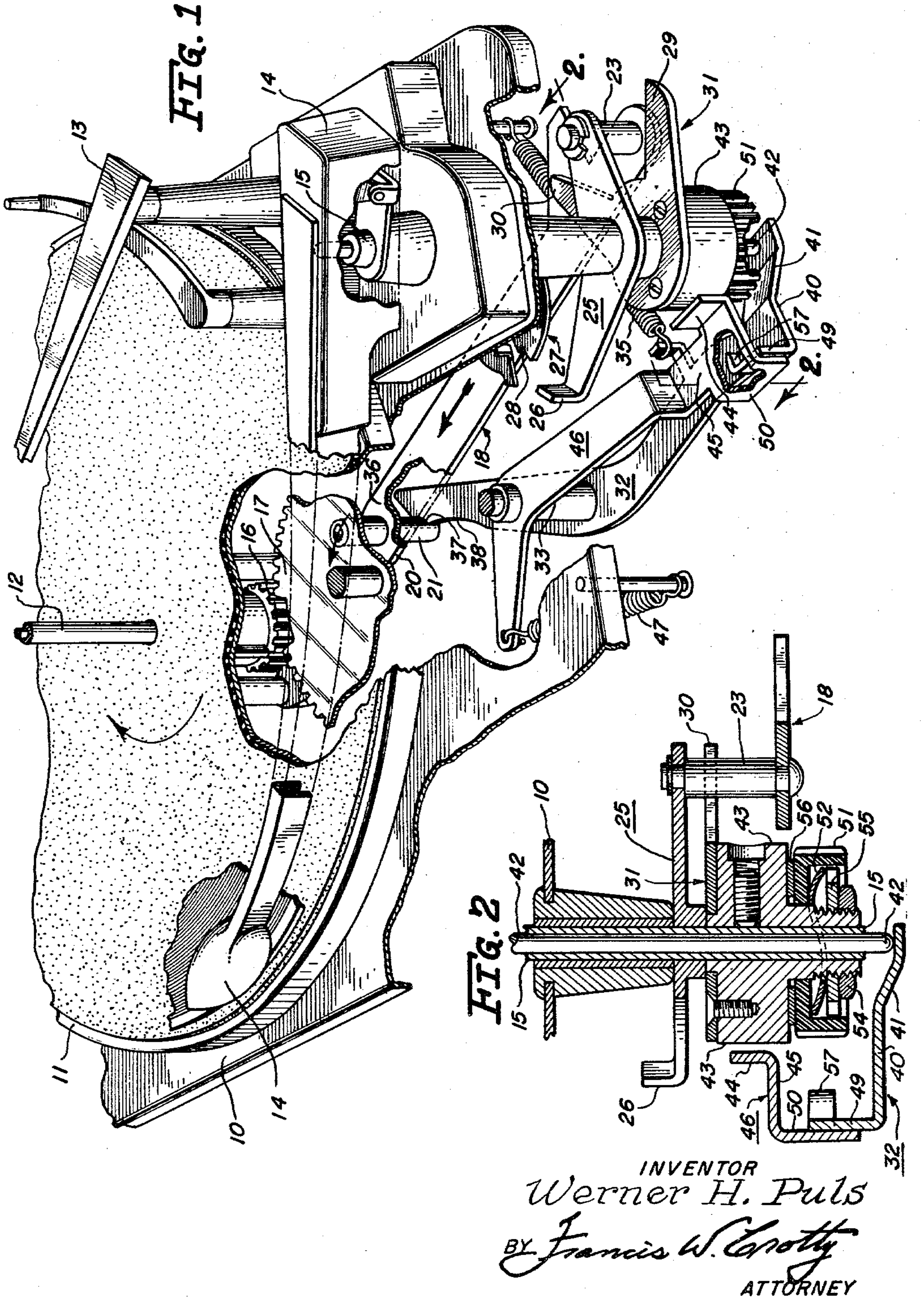

This invention relates to a tone arm brake assembly for an automatic record changer and more specifically to a brake assembly having two distinctive braking elements.

Many of the automatic record changers of today include a brake assembly on their tone arm moving mechanisms for retarding the motion of the tone arm as it swings across the turntable of the record changer. A brake is necessary when the tone arm moving mechanism is connected to the tone arm by a unidirectional type coupling. With this type of coupling once the tone arm moving mechanism starts to move the tone arm in a given direction, the tone arm would continue to move unless there was some retarding force. The tone arm moving mechanism and its associated brake meet the most critical test when the tone arm must be positioned over the commencement groove of a record in place on the turntable of the automatic record changer. Because of slight variations in the diameter of records which are nominally of the same size the allowable tolerance for the tone arm moving mechanism in locating the stylus of the tone arm over the commencement groove of a record is extremely small.

Accordingly it is an object of this invention to provide an improved tone arm brake assembly for an automatic record changer.

It is a further object to provide a brake assembly which provides positive braking action for accurate set down of a tone arm in the commencement groove of a record.

The invention is a tone arm brake assembly for an automatic record changer having a turntable, a tone arm rotatably mounted on a shaft secured to a mounting base and adapted to engage the groove of a record to be played on the turntable, and a tone arm moving mechanism which is actuated to move the tone arm vertically and laterally in predetermined time relation during a record change cycle. The assembly comprises a first brake means, having a portion thereof fixed to the shaft, for exerting a relatively light braking force on the shaft and tone arm during the vertical movement of the tone arm. There is also a second brake means, having a portion thereof fixed to the shaft, for exerting a relatively heavy braking force on the shaft and tone arm during the lateral movement of the tone arm. Finally, an actuating means is coupled to and actuated by the tone arm moving mechanism for applying the first brake means during vertical movement and the second brake means during lateral movement of the tone arm.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements, and in which:

FIGURE 1 is a perspective view of a part of an automatic record changer including a tone arm brake assembly in accordance with the invention; and FIGURE 2 is a sectional view of FIGURE 1 taken along line 2—2.

Referring now to FIGURE 1, the automatic record changer there shown includes a mounting base 10 upon which a turntable 11 is supported for rotation and driven by a driving mechanism (not shown). The record changer further includes a center spindle 12 with an offset upon which records to be played are stacked, the records being held in a horizontal position by a leveler arm 13 which is partially shown. A tone arm 14 is rotatably mounted on a tone arm shaft 15 secured to mounting base 10 and is adapted to engage the grooves of a record to be played in a manner well known in the art.

The following steps are usually involved in a record change cycle: (1) When the tone arm tracks to the end of a record, it initiates a cycle of the record changing mechanism which raises the tone arm to disengage its stylus from the played record. (2) The tone arm is moved outwardly to a position clear of the path of movement of a record traveling from the stack to the playing position on a turntable. (3) A record is released from the stack onto the turntable. (4) While the record is being released from the stack or just before its release a sensing device is actuated to determine the size of the record. (5) The tone arm is moved back over the edge of the record to be played and then is lowered on the commencement groove of a record. The change cycle is then complete.

The tone arm moving mechanism comprises a gear 16 which is affixed to turntable 11 and rotates freely within the mutilated section of a gear 17 during the play of a record. However at the end of the play a velocity trip mechanism which is well known in the art is actuated to shift a lever within the gap of gear 17 to in effect fill its mutilation and causes gear 16 to engage gear 17. This initial engagement is the start of a record change cycle during which gear 16 rotates in a clockwise direction driving gear 17 in a counterclockwise direction but for only one revolution.

The specific mechanism for moving the tone arm includes a link 18 having one extremity 20 which is fixed to a pin 21 eccentrically disposed on the under side of gear 17. The opposite end of link 18 is provided with an upwardly protruding pin 23 which engages one end of an arm 25 that is supported for rotation about tone arm shaft 15. The other end of arm 25 includes a projecting tab 26 which is engageable with a tone arm locating member 27. Locating member 27 includes a series of stop abutments which correspond to the size of a record to be played; for example, stop abutment 28 might correspond to a 10-inch record. A sensing device detects the record size and places the corresponding stop abutment in the path of movement of projecting tab 26. A further explanation of the sensing device will be found in a copending application of Maurice E. Hardy and Werner Puls, Serial No. 78,023, filed December 23, 1960, now Patent No. 3,030,115, and assigned to the same assignee as the present application, and titled "Tone Arm Positioning Assembly."

Pin 23 is also positioned between the legs 29 and 30 of an essentially V-shaped member 31 which is fixed at its apex to shaft 15. Counter-clockwise rotation of gear 17 causes movement of link 18 in the direction shown by the arrow and moves pin 23 against leg 30 to cause counter-clockwise rotation of shaft 15 and tone arm 14; continued rotation of gear 17 moves link 18 in the opposite direction to place pin 23 against leg 29 causing clockwise rotation of tone arm 14.

While rotation of tone arm 14 may be effected by link 18, it is also necessary that the arm be lifted and lowered at the start and completion of the record change cycle. To that end there is provided a tone arm lifting and lowering lever 32 which is pivoted on a stud 33 from base 10 and biased in a counter-clockwise direction by a spring 35. One end 36 of lever 32 engages pin 21 and provides a detent position for gear 17. End 36 also has a ramp surface 37 and a circular engagement surface 38. Rotation of gear 17 in a counter-clockwise direction, as shown by the arrow, moves pin 21 out of the detent on end 36 and along ramp surface 37 allowing gradual counter-clockwise rotation of lever 32. As gear 16 continues to rotate, pin 21 clears ramp 37 of lever 32. The counter-clockwise movement of lever 32 is limited by engagement of a tooth 57 on an opposite end 40 of the lever with a disc 51 to be described later. Pin 21 engages surface 38 of lever 32 during the return stroke of link 18 when it is moving in a direction opposite to that of the arrow to rotate lever 32 in a clockwise direction back to its original position.

End 40 includes a cam surface 41 which is adapted to engage a lifting pin 42 which is inserted in the hollow center of tone arm shaft 15. Upward movement of lifting pin 42 raises the tone arm and downward movement lowers it. Thus, counter-clockwise movement of lever 32 cams lift pin 42 upward raising the tone arm and thereafter clockwise movement of the lever lowers the tone arm.

The record changer further includes means for releasing records on the turntable 11 from a stack on spindle 12. This mechanism is usually located within spindle 12 and is old in the art; it will not be discussed further.

In accordance with the invention a tone arm brake assembly is provided for braking the rotational movement of the tone arm moving mechanism during a record change cycle to maintain adequate control of the tone arm. The assembly includes a first brake for exerting a first braking force on the tone arm moving mechanism and comprises a cylindrical brake drum 43 fixed to shaft 15 and engageable by a brake shoe 44 extending from an end 45 of a brake lever 46. Lever 46 is mounted for rotation on stud 33 and is biased by a spring 47 in a counter-clockwise direction. An upward protruding tab 49 on end 40 of lever 32 is engageable with a downward protruding tab 50 which is on end 45 of brake lever 46 to ordinarily locate brake shoe 44 out of contact with brake drum 43 as best shown in FIGURE 2. Movement of tone arm lifting lever 32 in a counter-clockwise direction moves tab 49 away from tab 50 to allow brake lever 46 to rotate and apply brake shoe 44 against drum 43. The brake is applied at approximately the same time that cam surface 41 begins to cam pin 42 upward to lift the tone arm from a record. Thus, the brake 43, 44 prevents any lateral movement of tone arm 14 during the lifting operation. Conversely, the brake is applied during any lowering operation of the tone arm onto a record to be played.

In addition to the first brake as described above a second brake is provided for exerting a second braking force on the tone arm moving mechanism and is applied in timed relation to the first brake. This includes a disc 51 having a toothed circumference and mounted for rotation on shaft 15. The top surface of the disc is biased against the bottom surface of brake drum 43 by a spring washer 52 which is retained in a recess in the disc by a nut 54 and a lock nut 55. The washer and nut also allow adjustment of the pressure between disc 51 and drum 43. A spring steel washer 56 is inserted between drum 43 and disc 51 to provide a uniform coefficient of friction between the two surfaces. The toothed circumference of disc 51 is in the plane of movement of a single tooth 57 which extends from tab 49 of lever 32. Tooth 57 is spaced a sufficient distance from disc 51 to be free from engagement with its toothed circumference until tone arm lifting and lowering lever 32 has rotated the entire cam surface 41 under pin 42. With disc 51 engaged by tooth 57, rotary movement of the disc is prevented and therefore rotary movement of brake drum 43 and the tone arm moving mechanism is retarded.

*Operation*

The operation of the tone arm brake assembly will be described in the context of the record change cycle. Assume initially that the record change mechanism is in the condition as shown in FIGURE 1 with a record on the turntable being played. When tone arm 14 reaches the fast finishing grooves of the record the velocity trip mechanism causes gear 16 to engage gear 17. As gear 17 rotates, link 18 is pulled by pin 21 in the direction as shown by the arrow moving pin 23 toward leg 30 of member 31. As this occurs and before pin 23 engages leg 30, tone arm lifting lever 32 is released from pin 21 and slides along the pin on its ramp surface 37 in a counter-clockwise direction under the influence of spring 35 to cam lifting pin 42 upwardly raising the tone arm from the record. At the same time a sensing arm senses the size of a record on the stack and rotates locating member 27 to locate the abutment corresponding to the size of a record on the stack in the path of movement of tab 26.

In accordance with the invention tone arm lowering and lifting lever 32 is a part of an actuating mechanism which applies brakes 43, 44 and 43, 51 in timed relation during the record change cycle. The initial counter-clockwise movement of lever 32 when released by pin 21 places brake shoe 44 against brake drum 43 and therefore provides a braking force to suppress lateral motion of the tone arm while it is lifted from the groove of the record. After the tone arm has been lifted by the camming surface 41, tooth 57 engages disc 51 to apply the second brake which provides a second braking force on the tone arm moving mechanism during lateral movement of the tone arm moving mechanism during lateral movement of the tone arm over the turntable caused by engagement of pin 23 with leg 30. As gear 17 continues to rotate, it moves link 18 on a return stroke in the opposite direction to that shown by the arrow and thus moves pin 23 of the linkage towards engagement with leg 29. Before leg 29 is engaged however, a release mechanism (not shown) which is connected to gear 17 drops a record to turntable 13. After the record has been dropped, pin 23 engages leg 29 to move tone arm 14 to a position over the commencement groove of the record. In accordance with the invention the tone arm is prevented from overshooting this position by the retardation action of brakes 43, 44 and 43, 51. Further rotation of gear 17 rotates tone arm lifting lever 32 clockwise to its original position dis-engaging tooth 57 from the teeth of disc 51 and lowering the tone arm on the commencement groove of the record on the turntable. During its lowering motion, the tone arm is held against any sideways motion by the first brake 43, 44 which is released only when the tone arm has been fully lowered. In summary, the second brake is applied only during lateral motion of tone arm 14 over the turntable and only the first brake is engaged during periods in which the tone arm is lifted from or lowered into engagement with a record on the turntable. The amount of braking force necessary to stop the lateral motion of the tone arm is dependent on the mass and speed of the arm. It is determined by appropriate selection of both the material and contact area of washer 56. In any case it is usually a greater force than is needed to prevent lateral motion of the tone arm during lifting and lowering periods. Thus, any undesired movement during engagement or disengagement of the tone arm with a record which could be caused by the release of a heavy brake is minimized by the relatively light braking force of the first brake.

The invention as described provides a tone arm brake which is positive and reliable in its operation and which makes possible accurate positioning of the tone arm during the change cycle operation.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A tone arm brake assembly for an automatic record changer having a turntable, a tone arm rotatably mounted on a shaft secured to a mounting base and adapted to engage the groove of a record to be played on the turntable, and a tone arm moving mechanism which is actuated to move said tone arm vertically and laterally in predetermined time relation during a record change cycle, the assembly comprising:

a first brake means, having a portion thereof fixed to said shaft, for exerting a relatively light braking force on said shaft and tone arm during said vertical movement of said tone arm;

a second brake means, having a portion thereof fixed to said shaft, for exerting a relatively heavy braking force on said shaft and tone arm during said lateral movement of said tone arm;

and an actuating means coupled to and actuated by said tone arm moving mechanism for applying said first brake means during said vertical movement and said second brake means during said lateral movement.

2. A tone arm brake assembly according to claim 1 in which said first brake means is of the drum type comprising a brake drum and a brake shoe which is actuated by said actuating mechanism and in which said second brake means is of the disc type having a disc shaped surface frictionally engaged with another surface.

3. A tone arm brake assembly according to claim 2 in which said brake drum of said first brake means is said portion of said first brake means fixed to said shaft and said other surface of said second brake means is said portion of said second brake means fixed to said shaft.

References Cited in the file of this patent

UNITED STATES PATENTS

| | | |
|---|---|---|
| 2,762,626 | Carlson | Sept. 11, 1956 |
| 2,868,547 | Vistain | Jan. 13, 1959 |
| 2,962,289 | Greene | Nov. 20, 1960 |